United States Patent [19]

Bloomfield

[11] 4,184,635

[45] Jan. 22, 1980

[54] CONTROL UNITS FOR HEATING SYSTEMS

[76] Inventor: Edward J. Bloomfield, The Studio, Convent La., South Woodchester, Stroud, Gloucestershire, England

[21] Appl. No.: 768,631

[22] Filed: Feb. 14, 1977

[30] Foreign Application Priority Data

Feb. 21, 1976 [GB] United Kingdom ............... 6907/76
Feb. 27, 1976 [GB] United Kingdom ............... 7871/76

[51] Int. Cl.² ............................................... F24J 3/02
[52] U.S. Cl. ................................. 126/419; 126/436; 126/437; 126/400; 165/18
[58] Field of Search .................. 126/270, 271, 400; 237/1 A; 165/18, 19, 22, 32; 219/314

[56] References Cited

U.S. PATENT DOCUMENTS

| | | | |
|---|---|---|---|
| 1,495,658 | 5/1924 | Wilkinson | 219/314 |
| 3,122,199 | 2/1964 | Byloff | 165/2 |
| 3,617,700 | 11/1971 | Hooper | 219/314 X |
| 3,933,197 | 1/1976 | Zimmer et al. | 165/2 |
| 3,986,489 | 10/1976 | Schlesinger | 126/270 |
| 3,998,207 | 12/1976 | Watt | 126/271 |
| 4,019,495 | 4/1977 | Frazier et al. | 237/1 A X |
| 4,037,785 | 7/1977 | Madern | 126/400 X |
| 4,083,490 | 4/1978 | Cunningham et al. | 237/1 A |

*Primary Examiner*—Samuel Scott
*Assistant Examiner*—Larry Jones
*Attorney, Agent, or Firm*—Cushman, Darby & Cushman

[57] ABSTRACT

A control unit has two inputs for connection to respective temperature sensors, and alternative primary and secondary outputs. It comprises a comparison circuit operative to sense the differential between the two input temperatures, switching means to render the primary and secondary outputs alternatively operable, and circuit means for controlling the switching means in dependence on said temperature differential. In a typical solar heating system employing such units a plurality of the units are connected in cascade with the secondary outputs of successive units when operable respectively energizing the next succeeding unit. The units are individually associated with a like plurality of heat stores, each sense the temperatures of a solar energy collector on the one hand and the corresponding heat store on the other hand. The primary output of each unit controls means for transferring heat from the collector to the corresponding store.

3 Claims, 4 Drawing Figures

CONTROL UNITS FOR HEATING SYSTEMS

BACKGROUND OF THE INVENTION

This invention relates to control units suitable for heating systems, and systems embodying such units.

A heating system supplying an environment often needs to be controlled in relation to the temperature of another environment, for example to maximize efficiency, or to maximize thermal loss or unwanted temperature differences. Also, it may be required to control the temperature of one environment to provide a fixed temperature differential between that and another environment, or between one environment and several others, or between various environments with various differentials related one to another. These, and related control operations, require control decisions at decision points within the control system relating to the activation of equipment to produce heat in a particular environment, or to transfer heat between environments.

The object of the invention is to provide an improved control unit for a heating system, which operates in dependence on the differential between two sensed temperatures and enables the differential to be maintained within close limits, and which is capable of a decision-making function in respect of output control.

SUMMARY OF THE INVENTION

According to the invention a control unit for a heating system has two inputs for connection to respective temperature sensors and alternative primary and secondary outputs, and comprises a comparison circuit operative to sense the differential between the two input temperatures, switching means adapted to render said outputs alternatively operable, and circuit means for controlling said switching means in dependence on said temperature differential.

Preferably said comparison circuit is a modified Wheatstone Bridge circuit for use with sensors in the form of thermistor probes. Although thermocouple sensors may be employed with the invention this is less desirable as thermistors have the facility of considerable resistance change over a small temperature range such as 0° C. to 100° C. and are more suited to the control of heating features of a normal living environment. Thermocouples also have the disadvantages of higher initial cost, the necessity for considerable amplification of the small output difference between the sensors, and greater difficulty in maintaining circuit stability.

To introduce stability and prevent "hunting", i.e. rapid and continual switching between the outputs, the circuit means of the unit of the invention may have an inbuilt degree of hysteresis or time leg, thereby reducing the sensitivity of the circuit as may be appropriate.

Alternatively the switching means may electrically energise one or other of the two outputs. The unit may operate for alternative switching of the two outputs according to whether one input temperature is above or below the other, i.e. whether the temperature differential is positive or negative. In this case a balanced Wheatstone Bridge circuit may be used, with an electrical balance achieved when the environmental temperatures respectively sensed by the sensors are identical. An example of the application of this basic function is to the control of the temperature of one room relative to another, when it is desired that both rooms be at the same temperature.

However, in some cases it is desired to maintain a preset temperature difference between a controlled environment and a comparison environment. Accordingly, the unit may enable such a temperature difference to be maintained preferably in an adjustable manner with a limit of zero to the adjustment range, i.e. to maintain a zero differential. To this end one branch of the bridge circuit may include a presettable variable resistance, the set difference in temperature to be maintained being balanced by the setting of this resistance. The decision-making function now operates as before, except that the appropriate output is switched according to whether the deviation from the preset differential is positive or negative. An example of the application of this differential function is to the control in a solar heating system of a water-circulated solar-energised water-heating panel.

If the solar energy collected is such that the temperature of the water within the panel rises above a small differential with respect to that of a storage tank, a circulating pump can be energised by the primary output to transfer the water thus heated into the tank. If the solar gain is negligible and insufficient gain exists to overcome the preset differential the secondary output line remains energised, and this in turn can control the use or selection of other forms of auxiliary heating equipment such as an electrical immersion heater or related devices such as vents, louvers, valves, insulation panels or blinds.

Units in accordance with the invention have a modular facility, in that a primary control unit can have its secondary output connected to a secondary control unit with its own primary and secondary outputs. Thus if switched the secondary unit is able to make a further alternative decision according to its input temperatures and temperature differential setting. In the application of this modular facility the onus of 'go to primary' or 'go to secondary' decisions is thus transferred throughout the decision network from primary to secondary units, and so on from one to the next according to the number of units connected in cascade.

The term "environment" is used herein in a broad general sense as including, for example, any heated space, volume or body, or contained body of fluid.

Other objects and features of the present invention will appear more fully below from the following detailed description considered in connection with the accompanying drawings which disclose preferred embodiments of the invention. It is to be expressly understood, however, that the drawings are designed for purposes of illustration only and not as a definition of the limits of the invention, reference for the latter purpose being had to the appended claims. In the drawings:

DESCRIPTION OF THE PREFERRED EMBODIMENTS

A mains energised transformer T1 and full-wave rectifier D1,D4 power supply circuit A, with smoothing circuit D2,R1,D5,C2 energises a modified Wheatstone Bridge circuit B, two opposite branches of which are provided by external thermistor sensor probes R3 and R8 which are respectively connected to two inputs I1 and I2 of the unit. Switching means of the unit comprise a change-over relay RLY1 with normally-closed contacts ReC by which a primary output P.O. is energised by the mains input, and normally-open contacts by which an alternative secondary output S.O. is similarly energised, the outputs sharing a common neutral line O.N. from the mains input.

Circuit means C for controlling the switching means comprise a difference amplifier IC1 fed with the output of the bridge circuit B, which output is taken from between the common point of the input sensors R3,R8 through a resistor R6 and the slider of a potentiometer VR1 of the bridge circuit. The amplifier output controls a transistor TR1 switching the relay coil Re. Light emitting diodes (LED) D8 and D9 provide indicator lights indicating the output switching condition. LED D8 is connected in parallel with the relay coil Re, and LED D9 is in series with a transistor TR2 switched alternately with the transistor TR1.

The operative differential function of the unit, i.e. the input temperature differential at which output switching occurs, is preset by means of the potentiometer VR1. The two sections of the potentiometer respectively provide portions of the other two opposite branches of the bridge, which branches are completed by fixed resistors R4 and R9.

The functional operation of each of the various circuit components has not been described in detail, as the circuit illustrated is merely a typical example of the manner in which the invention can be put into effect.

The use of a single unit module as described enables a decision regarding two environments to be made, when the temperatures of the latter are outside predetermined units of temperature difference. The unit takes the decision either 'go' or 'no go' in respect to the transfer of energy, by energisation of primary output P.O., from a first environment to a second environment. If the decision is 'no go' the unit provides a secondary output S.O. to actuate the introduction of an auxiliary energy source, for example, and/or to actuate the control of other equipment such as electric motors, solenoids, relays, etc.

Figure 1:
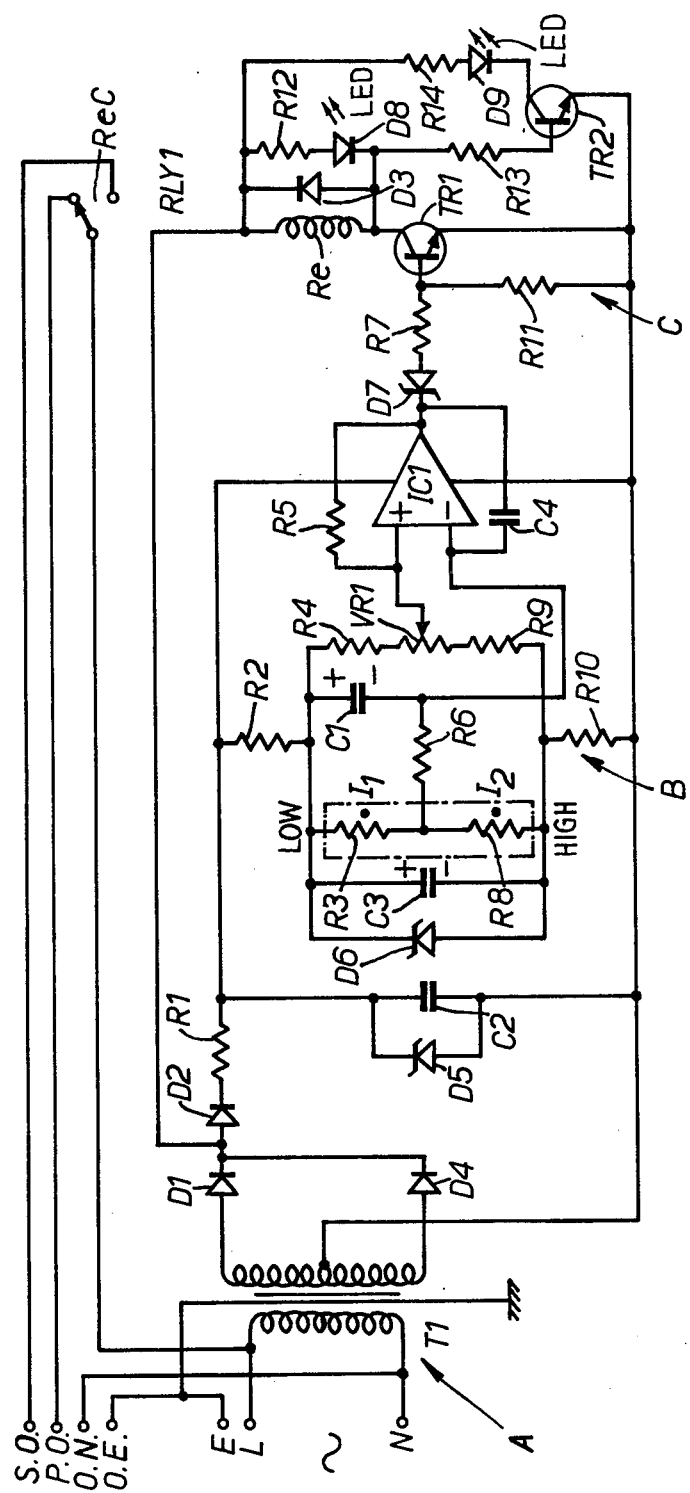
FIG. 1 is a block circuit diagram of the unit.
Figure 2:
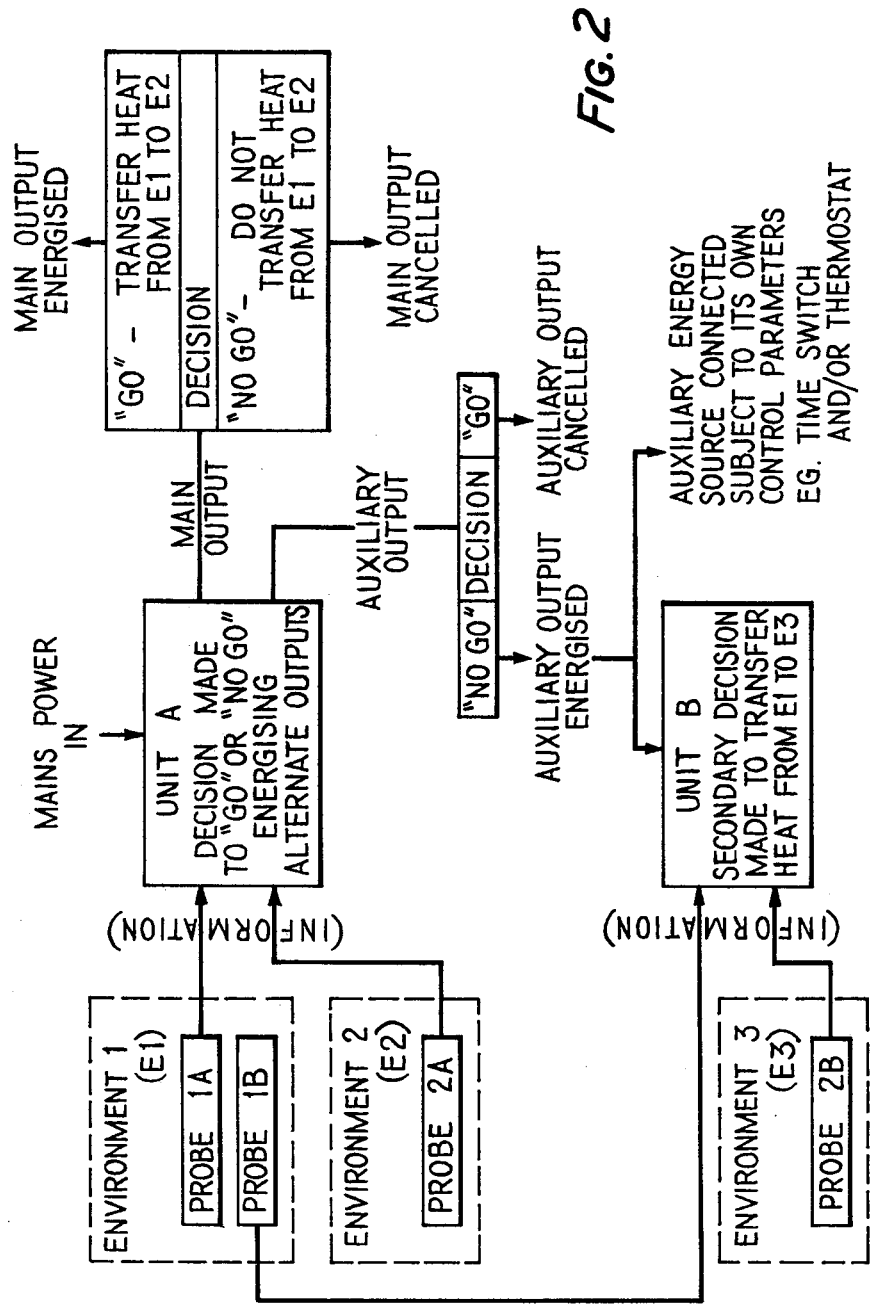
FIG. 2 is a diagrammatic chart representing the decision and output network resulting from the use of two such units in cascade.

Introduction of a second unit module, with the two modules interconnected in cascade introduces a secondary level 'go' or 'no go' decision with the units associated with transfer of energy between three environments. The resulting decision and output network is illustrated diagrammatically in the flow diagram of FIG. 2, which shows units A and B associated with environments E1, E2 and E3 with unit B energised by the output S.O. of unit A when the latter takes a 'no go' decision regarding transfer of energy from E1 to E2. The inputs of unit A are provided by probes 1A and 2A, respectively situated in environments E1 and E2; the inputs of unit A are provided by probes 1B and 2B, respectively situated in environments E1 and E3.

If unit A takes a 'no go' decision regarding transfer of energy from E1 to E2, unit B comes into operation to take a secondary level decision. This is either 'go', with the primary output of unit B energised to transfer energy from E1 to E3, or 'no go' with the secondary output of this unit energised. This secondary output is available for still further levels of decision taking, if required, or for the actuation of second level auxiliary equipment.

Instead of unit B acting to transfer energy from one of the environments sensed by the primary unit A it could, as will be appreciated, operate to transfer energy between two neither of which is sensed by unit A.

Figure 3:
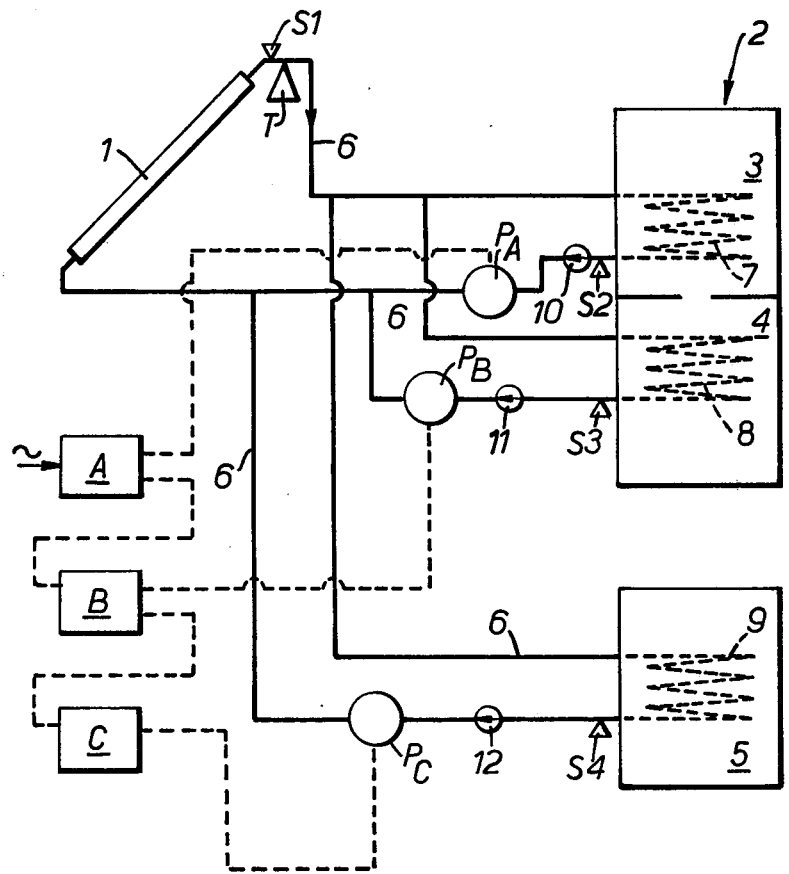
FIG. 3 is a schematic flow diagram illustrating the application of three unit modules in cascade to the control of a solar-energised water-heating system.

In the system of FIG. 3, three units A, B and C connected in cascade, as described, control the transfer of thermal energy between four environments. The latter are provided by a solar collector panel 1 of conventional form, a primary 'core' heat store 3, a secondary heat store 4, and a tertiary separate heat store 5. The primary and secondary stores 3 and 4 are component parts of a main heat storage unit or tank 2. The thermal energy is transferred by the circulation of water, heated in the panel 1, through piping 6. Indirect heating coils 7, 8 and 9 are submerged in the water volumes in the heat stores 3, 4 and 5.

Each of the units A, B and C controls a corresponding circulating pump $P_A$, $P_B$ or $P_C$ connected in the return line from the respective heat exchange coil 7, 8 or 9. Non-return valves 10, 11 and 12 are also connected in the return lines before the pumps. Temperature sensors providing inputs for the units are positioned at points S1, S2, S3 and S4 of the system. A thermostat T is positioned adjacent the sensor point S1.

The units A, B and C operate in sequence as described and, denoting the various sensed temperatures by TS1, TS2, TS3, etc., if TS1–TS2 is positive unit A energises pump $P_A$ to transfer collected energy to heat store 3. If TS1–TS2 becomes negative pump $P_A$ is de-energised and unit B switched into operation, and this unit energises pump $P_B$ to transfer energy to heat store 4 as long as TS1–TS3 is positive. Should TS1–TS3 become negative, then pump $P_B$ is in its turn de-energised and unit C switched into operation. In a similar manner, unit C energises pump $P_C$ if TS1–TS4 is positive but, in this case, if TS1–TS4 becomes negative the solar-collection system closes down as there is no lower grade heat store to which energy can be transferred.

It will be appreciated that if at any time circumstances change so that a higher grade heat store can be supplied, the appropriate unit will take over and energise the corresponding pump. Thermostat T operates to energise pump $P_C$ if at any time the water in the collector 1 boils. When the solar system closes down, the auxiliary output of unit C may be employed to energise an auxiliary heat source, such as an immersion heater in the primary store 3. Instead of the three pumps $P_A$, $P_B$ and $P_C$ which are selectively energised, a single pump (not shown) may be employed with three solenoid valves which are selectively energised in the same manner and which respectively connect the pump flow to the corresponding heat stores.

Figure 4:
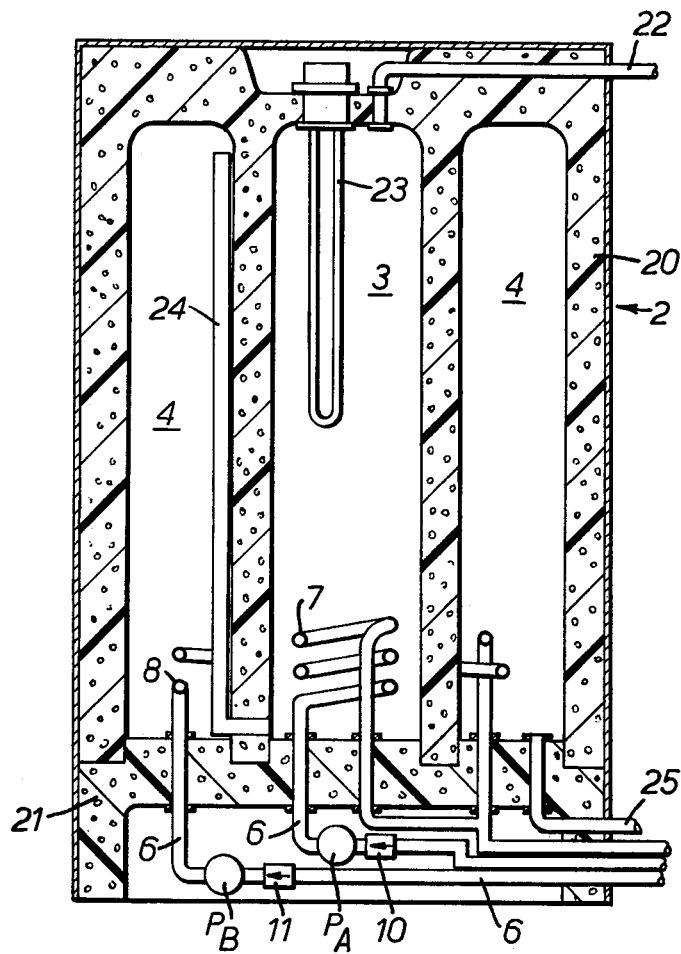
FIG. 4 is an axial sectional view of a practical form of heat storage unit for use in the system of FIG. 3.

FIG. 4 illustrates a practical design of hot water storage tank which can provide the storage means 2 of FIG. 3. The tank is formed from two rigid foam plastics mouldings secured together, a top body shell moulding 20 and a base moulding 21. A hot water core, providing the primary store volume 3, is surrounded by an annular secondary store volume 4 of warm water. The primary store 3 has a top connection to a hot water outlet 22, and the immersion heater 23 referred to is fitted into the top of the moulding 20. A transfer pipe 24 interconnects the stores, through which warm water from the top of store 4 enters the bottom of store 3 to make up water drawn off through outlet 22. A cold water supply pipe 25 enters at the bottom of the store volume 4. The piping 6 to the heating coils 7,8 enters through the bottom moulding 21, and the corresponding pumps $P_A, P_B$ and valves 10,11 are housed in the dished base of that moulding.

The tank is moulded from a material such as polyurethane, which is not normally suitable for hot water tanks as its strength decreases with temperature. However, the dividing wall between volumes 3 and 4 is hydrostatically balanced and hence its reduced strength at the elevated temperature is not important as it merely acts as a heat insulating division. The outer wall surrounding the volume 4 is much cooler, and hence stronger, and surrounding the hot water volumn 3 by the cooler water 4 also cuts down heat losses by conduction and radiation. If considerations of strength necessitate it, only the inner wall need be of foamed plastics material with the outer wall formed from copper or steel, for example.

In the system of FIG. 3 the secondary output of unit C may be unused, or omitted so that only a simple single-output unit need be provided in this situation although it will normally be more convenient to use three identical units. In fact, any of the secondary outputs can be utilised to bring an auxiliary heat source, such as an immersion heater, into operation. Thus the secondary output of unit A, in addition to energising unit B, could operate an immersion heater (not shown) in the primary heat store 3. The only condition in such use of the secondary outputs is that the auxiliary heat source, such as an immersion heater, must supply heat either to the heat store associated with the unit concerned or to an earlier heat store in the heat storage chain.

An alternative exemplary use of a control unit in accordance with the invention, which is not illustrated, is in connection with a grain store. In this case one of the input probes would be situated in the central core of the store and the other typically positioned near the edge thereof, say 6 inches in from the edge. The primary and secondary outputs may respectively energise a green 'OK' light, when the temperature differential is within the preset limit, and a red 'danger' light when the internal core temperature rises to a danger limit with respect to the outer temperature. The secondary output may also energise an audible alarm and bring cooling means, such as cooling fans, ventilation louvres, etc., into operation.

I claim:

1. In a solar heating system comprising a solar energy collector panel, primary and secondary heat stores, and first and second means operatively connected, respectively, to transfer collected energy from said energy panel to said primary and secondary heat stores; a control system comprising:

a primary control unit with two inputs connected to respective first and second temperature sensors and with two separate alternative primary and secondary outputs, said first and second sensors respectively sensing temperatures which are representative of the temperature of collected energy available at the solar energy collector panel and of the temperature in the primary heat store, said primary control unit including a comparison circuit, means for connecting said first and second temperature sensors to said comparison circuit, said comparison circuit being operative to sense the differential between said sensed output temperatures, switching means connected to said primary and secondary outputs for rendering said separate outputs alternatively operative, and circuit means connected to the output of said comparison circuit and to said switching means for controlling said switching means dependent upon the sensed temperature differential at the output of said comparison circuit, whereby said primary output is operative to energize said first means operative to transfer collected energy when said temperature differential exceeds a predetermined value and said secondary output is alternatively operative when said temperature differential is below a predetermined value; and a secondary control unit similar to said primary control unit and operatively interconnected therewith to be energized when said alternative secondary output of said primary control unit is operative, said secondary control unit controlling the transfer of energy from said secondary heat store by said second means operative to transfer collected energy, and said secondary output of said secondary control unit being operative for further control purposes when the corresponding temperature differential sensed by the secondary control unit is less than said predetermined value.

2. A solar heating system incorporating operatively associated primary and secondary control units according to claim 1, wherein said energy is transferred by heat exchange employing water as the heat exchange fluid and said heat stores comprise a hot water tank with interconnected primary and secondary heat store sections, said means operative to transfer collected energy respectively comprise first and second circulating pumps controlled respectively by said primary outputs of said primary and secondary control units, said primary and secondary sections of the tank being connected so as to be supplied with collected energy from said panel by said first and second circulating pumps respectively, and said secondary control unit is connected so that said secondary output thereof controls auxiliary heating equipment operative to supply energy at least indirectly to the water in said tank.

3. A solar heating system according to claim 2, wherein a further heat store and an associated third circulating pump are provided, combined with a third control unit having a primary output which controls said third pump and which is operatively interconnected with said secondary control unit so as to be energized by the secondary output thereof.

* * * * *